(12) United States Patent
Dietz et al.

(10) Patent No.: US 9,120,079 B1
(45) Date of Patent: Sep. 1, 2015

(54) HIGH CAPACITY CARBON DIOXIDE SORBENT

(71) Applicant: TDA Research, Inc., Wheat Ridge, CO (US)

(72) Inventors: Steven Dean Dietz, Englewood, CO (US); Gokhan Alptekin, Boulder, CO (US); Ambalavanan Jayaraman, Denver, CO (US)

(73) Assignee: TDA Research, Inc., Wheat Ridge, CO (US)

( * ) Notice: Subject to any disclaimer, the term of this patent is extended or adjusted under 35 U.S.C. 154(b) by 0 days.

(21) Appl. No.: 14/217,218

(22) Filed: Mar. 17, 2014

Related U.S. Application Data

(60) Provisional application No. 61/787,761, filed on Mar. 15, 2013.

(51) Int. Cl.
*B01J 20/22* (2006.01)
(52) U.S. Cl.
CPC ...................... *B01J 20/22* (2013.01)
(58) Field of Classification Search
CPC ....... C01B 31/08; B01J 2220/50; B01J 20/00; B01J 20/20; B01J 20/28; B01J 20/28014; B01J 20/28019; B01J 28/28054; B01J 20/28057; B01J 20/28069
USPC .......................................................... 502/416
See application file for complete search history.

(56) References Cited

U.S. PATENT DOCUMENTS

| | | | |
|---|---|---|---|
| 3,491,031 A | 1/1970 | Stoneburner | |
| 4,810,266 A | 3/1989 | Zinnen et al. | |
| 5,376,614 A | 12/1994 | Birbara et al. | |
| 5,492,683 A | 2/1996 | Birbara et al. | |
| 5,620,940 A | 4/1997 | Birbara et al. | |
| 5,876,488 A | 3/1999 | Birbara et al. | |
| 6,364,938 B1 | 4/2002 | Birbara et al. | |
| 6,547,854 B1 | 4/2003 | Gray et al. | |
| 7,288,136 B1 | 10/2007 | Gray et al. | |
| 7,541,312 B2 | 6/2009 | Dietz et al. | |

(Continued)

FOREIGN PATENT DOCUMENTS

WO   WO2013169803 A1 * 11/2013 ................ C01B 3/08

OTHER PUBLICATIONS

Alptekin, Gökhan, et al. "A Low Cost, High Capacity Regenerable Sorbent for CO2 Capture." A&WMA's 102nd annual conference & exhibition. Detroit, MI, USA. 2009.*

(Continued)

*Primary Examiner* — Richard M Rump
(74) *Attorney, Agent, or Firm* — Brian J. Elliot

(57) ABSTRACT

The present invention provides a sorbent for the removal of carbon dioxide from gas streams, comprising: a $CO_2$ capacity of at least 9 weight percent when measured at 22° C. and 1 atmosphere; an $H_2O$ capacity of at most 15 weight percent when measured at 25° C. and 1 atmosphere; and an isosteric heat of adsorption of from 5 to 8.5 kilocalories per mole of $CO_2$. The invention also provides a carbon sorbent in a powder, a granular or a pellet form for the removal of carbon dioxide from gas streams, comprising: a carbon content of at least 90 weight percent; a nitrogen content of at least 1 weight percent; an oxygen content of at most 3 weight percent; a BET surface area from 50 to 2600 $m^2/g$; and a DFT micropore volume from 0.04 to 0.8 cc/g.

15 Claims, 15 Drawing Sheets

(56) References Cited

U.S. PATENT DOCUMENTS

2011/0223494 A1* 9/2011 Feaver et al. ............... 429/405
2013/0168321 A1 7/2013 Cannon et al.

OTHER PUBLICATIONS

Alptekin, Gökhan, et al. "A Low Cost, High CapacityA Low Cost, High Capacity Regenerable Sorbent for Pre-Combustion CO2 Capture". Mega Symposium. Aug. 30, 2010.*

Alpetkin, G., et al. "Post-Combustion CO2 Capture System for Existing Coal-fired Power Plant ". DOE/NETL CO2 Capture Technology Meeting Meeting . Jul. 8, 2013.*

T. Budinova, E. Ekinci, F. Yardim, A. Grimm, E. Björnbom, V. Minkova, M. Goranova, Characterization and application of activated carbon produced by H3PO4 and water vapor activation, Fuel Processing Technology, vol. 87, Issue 10, Oct. 2006, pp. 899-905, ISSN 0378-3820, http://dx.doi.org/10.1016/j.fuproc.2006.06.005.*

Li, Lei, Patricia A. Quinlivan, and Detlef RU Knappe. "Effects of activated carbon surface chemistry and pore structure on the adsorption of organic contaminants from aqueous solution." Carbon 40.12 (2002): 2085-2100.*

Gokhan Alptekin et al., A Low Cost, High Capacity Reenerable Sorbent for CO2 Capture, A&WMA's 102nd Annual Conference & Exhibition, Jun. 16-19, 2009, Detroit MI.

Gokhan Alptekin et al., A Low Cost, High Capacity regenerable Sorbent for Pre-Combustion CO2 capture (Mega Symposium), Aug. 30, 2010.

Karl Berlier et al., Adsorption of CO2 on Activated Carbon: Simultaneous Determination of Integral Heat and Isotherm of Adsorption, J. Chem. Eng. Data, 1996, 41, 1144-1148.

Xiaolong Yao, et al., A new model for calculating the adsorption equilibrium of water vapor in micropores of activated carbon, computational Materials Science 89 (2014)137-141.

Bansal, R.C., J.-B. Donnet and F.Stoeckli (1988). Active Carbon, Marcel Dekker: New York.

* cited by examiner

HIGH CAPACITY CARBON DIOXIDE SORBENT

CROSS REFERENCE TO RELATED APPLICATIONS

The present application claims the benefit of the provisional application No. 61/787,761 filed Mar. 15, 2013 (titled HIGH CAPACITY CARBON DIOXIDE SORBENT, by Steven Dean Dietz, Gokhan Alptekin, and Ambalavanan Jayaraman), which is incorporated by reference herein. Provisional application No. 61/787,761 is not admitted to be prior art with respect to the present invention by its mention in the background or cross-reference section.

STATEMENT REGARDING FEDERALLY SPONSORED RESEARCH OR DEVELOPMENT

This invention was made using U.S. government funding through the U.S. Department of Energy contract Nos. DE-FE0000469 and DE-SC0006239 and Environmental Protection Agency contract No. EP-D-11-051. The government has certain rights in this invention

BACKGROUND

Fossil fuel combustion is increasing the atmospheric concentration of $CO_2$ and causing concerns over global warming. The electric power generation industry is one of the largest $CO_2$ emitters; roughly one third of the U.S. carbon emissions come from power plants. There is a need to find cost-effective ways to recover $CO_2$ from the flue gases of existing power plants and other large point sources, for example refineries and cement plants.

There is also a need to remove $CO_2$ from natural gas or biogas generated from anaerobic digesters to upgrade the methane concentration so that they can be used in a pipeline, to generate electricity or to run natural gas vehicles, for example.

The methods for post-combustion flue gas $CO_2$ separation from existing power plants include chemical and physical solvent processes, chemical absorption and physical adsorption using solid sorbents, $CO_2$ selective membranes and cryogenic separation. Chemical absorption using aqueous solutions of alkanolamines such as monoethanolamine (MEA) is a common $CO_2$ separation method. However, amine absorption has large capital and operating costs. Large amounts of heat are needed to dissociate the $CO_2$-amine complex via steam stripping during the regeneration step, resulting in very high energy consumption (Nsakala et al., 2001). The liquid phase contactors and circulation systems are also complex and expensive. Using conventional amine scrubbing to capture and purify $CO_2$ from flue gas for sequestration could nearly double the cost of electricity and reduces the plant's output by 30% (Ramezan et al., 2007).

Chemical absorbents also suffer from poor efficiency because of the large heat input required to break a chemical bond to regenerate the sorbent. Physical adsorbents that bind the $CO_2$ through a weaker interaction may help to reduce the regeneration energy input; however, the commercially available adsorbents have a number of drawbacks, including low capacity at the desired operating temperature, interference from water vapor and flue gas contaminants and poor cycle life.

Coal accounts for 56% of U.S. power generation and its contribution to future energy supply is expected to increase since U.S. has 25% of world's coal reserves (Tonks 2007). Coal-fueled Integrated Gasification Combined Cycle (IGCC) systems are environmentally superior to pulverized coal (PC)-fired boilers not only because they are more efficient at producing electricity, but also they can be equipped with more cost effective technologies for $CO_2$ capture and pollution control.

In an IGCC, it makes sense to capture the $CO_2$ early in the process (before the turbine), where it is concentrated and at high pressure, since it is far easier and less expensive to remove impurities when they are at high pressure and concentrated in the hot coal gas than when they are at atmospheric pressure and have been diluted by more 10:1 in the combustion turbine. The challenge for a $CO_2$ sorbent is that it must have high capacities and more importantly high stability at temperatures in the range of 100-300° C. Typically amine modified sorbents are not stable under these conditions.

On-site or on-farm manure to energy conversion is a highly attractive option for managing animal manure (as well as other agricultural bio-waste). Animal manure is an energy-rich opportunity fuel with a heating value of 8,500 Btu/lb (on a dry ash free basis). Large farms and feedlot operations produce large quantities of manure in a small area. Anaerobic digester units capable of producing pipeline quality methane installed at each farm or dairy could be instrumental in eliminating the difficulties associated with the transport of manure off site. Further, they could be a source of heat and electricity, while significantly reducing disposal costs and operating expenses for the farms and feedlots. If consumed properly, use of manure-derived fuels can also protect against environmental problems such as groundwater leaching and greenhouse gas emissions (methane emissions) associated with land filling of the farm wastes. The use methane that would otherwise be emitted into the atmosphere is an untapped resource of energy that has a significantly greater global warming potential (GWP) than $CO_2$. GWP is a measure of how much a given mass of greenhouse gas contributes to global warming over a specific time period compared to same mass of $CO_2$ over the same period (GWP of Methane over 100 years is 25 while that of $CO_2$ is 1).

The organic matter in the manure and other agricultural waste by-products can undergo a biological breakdown process in the absence of oxygen and be converted to "biogas". Biogas is most commonly produced by anaerobic digestion or fermentation of biodegradable materials. Anaerobic digester units are widely accepted and used in farms, food processing facilities and dairies across the nation, and the biogas produced by them is commonly referred to as anaerobic digester gas or ADG. This type of biogas is similar to natural gas but is diluted with large amounts of $CO_2$ (up to 45%), and therefore possesses less energy per unit volume than pipeline methane (natural gas). ADG is often used in a combined heat and power (CHP) gas engine to generate electricity and heat, which is used to meet the demands of the farm, dairy or food processing facility. The electricity demand varies greatly depending on the size of the facility and the nature of the process. Typically, energy requirements for a dairy farm range from 300-400 kWh per cow per year, to over 1500 KWh per cow per year depending on the type of barn used to house the cows, the type of lighting and cooling systems, the waste handling system, and the type of water heating (Ludington, 2004). However, anaerobic digestion of the manure collected per cow per year can produce up to 13,500 standard cubic feet (SCF) per year of methane (as biogas) with an energy content of 4,000 kWh. Frequently, the energy production capacity of the farm or feedlot is far greater than its total energy requirements. Hence, the excess energy or biogas or the manure (farm waste) needs to be exported. The most convenient and least capital intensive approach is to upgrade the biogas produced to "pipeline methane" specifications and put it into the natural gas distribution network where it can subsequently be used either for domestic heating or electricity generation.

Pressure swing and vacuum swing adsorption systems are useful for small to medium scale air separation to produce very high purity oxygen. These air separation systems use conventional physical adsorbents such as zeolites, carbon molecular sieves, activated carbons etc. Unfortunately, these sorbents are not suited for methane purification because they do not have the necessary selectivity for $CO_2$ over $H_2O$, and biogas is a humid gas. Hence, these sorbents are not suited for $CO_2$ removal or for producing pipeline methane from biogas because they have a water adsorption capacity that is too large for high moisture applications. As a result there is a need for a $CO_2$ sorbent with a high $CO_2$ capacity and low water capacity to improve $CO_2$ separations (for methane purification, for example).

U.S. Pat. No. 7,541,312 teaches a porous carbon characterized by a volumetric pore size distribution having two peaks, a first of said peaks being between 0.5 and 1.0 nm and a second of said peaks being between 1.0 and 5.0 nm. The porous carbon may have a volumetric capacitance in an organic electrolyte of at least 40 $F/cm^3$, an average pore diameter between about 2 nm and about 30 nm, a surface area of at least 900 $m^2/g$, and/or a density of at least 0.4 $g/cm^3$. A method for making such a carbon includes a) curing a mixture comprising a carbohydrate, a dehydrating component, and a nonmetallic cationic pore-forming agent and b) carbonizing the cured carbon under conditions effective to provide a porous carbon having a surface area between about 100 $m^2/g$ and about 3000 $m^2/g$. The dehydrating component and nonmetallic cationic component may comprise two moieties of one compound.

U.S. Pat. No. 7,288,136 teaches an improved method of treating an amine to increase the number of secondary amine groups and impregnating the amine in a porous solid support.

U.S. Pat. No. 3,491,031 teaches a method to create a $CO_2$ sorbent by treating activated carbon with gaseous alcohol amines such as MEA. It utilizes a wet-chemical stripping method employing MEA to remove the adsorbed $CO_2$ and regenerate the sorbent.

U.S. Pat. No. 6,547,854 teaches a method to create solid $CO_2$ sorbents by the treatment of an acidified or basified solid substrate with a substituted amine salt.

U.S. Pat. No. 6,364,938 teaches a method to create $CO_2$ sorbents by the incorporation of amine groups into a polymer substrate or backbone. The method is applicable to low load situations such as human breathing environments.

U.S. Pat. No. 5,876,488 teaches a method to create $CO_2$ sorbents by dispersing aqueous amines in polymeric materials. Such sorbents are limited in application to human breathing environments and at ambient temperatures of 25° C.

U.S. Pat. Nos. 5,620,940, 5,492,683 and 5,376,614, teach methods to create $CO_2$ sorbents by using amine-polyols on chemically inert supports. Sorbent desorption methods employ heat and/or reduced pressure.

U.S. Pat. No. 4,810,266 teaches a method to create $CO_2$ sorbents by treating carbonized molecular sieves with alcohol amines.

All of these references contain at least one of the following limitations: low carbon capacity, high cost, temperature limitations, high heat inputs for regeneration, and high water sorption. For all of these applications, there is a need for a low cost sorbent that has high $CO_2$ capacity, low water uptake (capacity or sorption), with long cyclic life and low energy input for regeneration (a low ΔH of adsorption).

BRIEF SUMMARY OF THE INVENTION

To solve the above problems the carbon sorbents of the present invention have one or more of the following features: high $CO_2$ capacity, low water capacity, high temperature stability, high selectivity, long cycle life and low energy input for regeneration.

An embodiment of this invention is a sorbent for the removal of carbon dioxide from gas streams, comprising: a $CO_2$ capacity of at least 9 weight percent when measured at 22° C. and 1 atmosphere; an $H_2O$ capacity of at most 15 weight percent when measured at 25° C. and 1 atmosphere; and an isosteric heat of adsorption from 5 to 8.5 kilocalories per mole of $CO_2$. In a preferred embodiment the isosteric heat of adsorption is from 5.1 to 7.3 kilocalories per mole of $CO_2$. In another embodiment the sorbent further comprises: a $CO_2$ capacity of at least 6 weight percent when measured at 60° C. and 1 atmosphere. Alternatively the sorbent comprises a $CO_2$ capacity of at least 4 weight percent when measured at 22° C. and 0.15 atmosphere; or at least 2 weight percent when measured at 60° C. and 0.15 atmosphere.

An embodiment of the present invention is a carbon sorbent in a powder, granular or pellet form to remove carbon dioxide from gas streams, comprising: (a) a carbon content of at least 90 weight percent; (b) a nitrogen content of at least 1 weight percent; (c) an oxygen content of at most 3 weight percent; (d) a BET surface area from 50 to 2600 $m^2/g$; and (e) a DFT micropore volume from 0.04 to 0.8 cc/g. In additional embodiments of the invention, the sorbent further comprising: an $H_2O$ capacity of at most 15 weight percent measured at 25° C. and 1 ATM. In a further embodiment the carbon sorbent comprises an isosteric heat of adsorption from 5.0 to 8.5 kilocalories per mole of $CO_2$, more preferably from 5.1 to 7.3 kilocalories per mole of $CO_2$.

In another embodiment the carbon dioxide capacity of at least 9 weight percent, if measured at 1.0 atm and 22° C.; a carbon dioxide capacity of at least 4 weight percent, if measured at 0.15 atm and 22° C.; a carbon dioxide capacity of at least 6 weight percent, measured at 1.0 atm and 60° C.; The sorbent of claim 1 further comprising: a carbon dioxide capacity of at least 2 weight percent, measured at 0.15 atm and 60° C.

In one embodiment the high capacity carbon dioxide sorbent is a porous carbon. The porous carbon incorporates "N" into the carbon structure to provide selective adsorption of $CO_2$ over $H_2O$. These porous carbons, which may have mesoporosity and/or microporosity, can be prepared from organic precursors, these precursors are selected from the following group, but are not limited to only these precursors; sugar (sucrose), corn starch, simple sugars such as fructose (high fructose corn syrup), and dextrose. The carbon preparation method uses ammonium compounds. The ammonium compounds include ammonium sulfate, ammonium bisulfate, ammonium carbonate, and ammonium phosphate dibasic. Other useful nitrogen compounds are urea and melamine.

The sorbent has a mesoporous and/or microporous carbon structure grafted (bonded or covalently bonded) with Lewis base functionalized groups to remove $CO_2$ via physical adsorption. The relatively strong Lewis acid-base interaction enables effective operation of the sorbent in the presence of the high levels of methane and moisture such as in anaerobic digester gas. However, because the Lewis base adsorption sites and the $CO_2$ do not form a true covalent bond, the heat input to regenerate the sorbent is lower than alternatives. For example, in one embodiment the heat input to regenerate the sorbent is about 5 to about 8.5 kcal per mole of $CO_2$, which is much lower than that observed for either chemical absorbents (e.g., 29.9 kcal/mol $CO_2$ for sodium carbonate) or amine-based solvents (e.g., 14.2 kcal/mol $CO_2$ for monoethanolamine) or the zeolites, which need very high vacuum for regeneration.

In another embodiment, the relatively strong Lewis acid-base interaction enables effective operation of the sorbent at high flue gas temperatures (60-150° C. range). However, because the Lewis base adsorption sites and the $CO_2$ do not form a covalent bond, the heat required to regenerate the sorbent is lower, and more favorable than the heat required to regenerate sodium carbonate or monoethanolamine.

In an embodiment, the carbon sorbents can be made from sugars and cornstarch as carbon precursors. To increase the $CO_2$ loading nitrogen compounds are incorporated into the carbon. This is done by adding nitrogen containing compounds to the carbon precursor before carbonization. Sorbents of this invention can be made using sucrose, dextrose, high fructose corn syrup (HFCS) and cornstarch. The nitrogen is bound tightly to the carbon and cannot be easily removed. These carbons are amorphous: such carbons do not have long-range crystalline order, which excludes other forms (allotropes) of elemental carbon such as diamond, graphite, graphenes, fullerenes or nanotubes.

In another embodiment one or more ammonium compounds are added to the precursors to catalyze the char formation. For example, heating a dextrose/cornstarch mixture to 200° C. gives a black char with one or more of the below listed ammonium compounds compared to light brown char without the ammonium compound. This is method is effective with reducing sugars such as dextrose and fructose. Useful additives are (but not limited to) ammonium sulfate, cetyltrimethylammonium bromide, ammonium carbonate, ammonium acetate, ammonium citrate, ammonium oxalate, ammonium formate, ammonium hydrogen citrate, ammonium hydrogen oxalate, ammonium chloride, ammonium bromide and ammonium phosphate. Urea and melamine

DETAILED DESCRIPTION OF THE INVENTION

Figure 1:
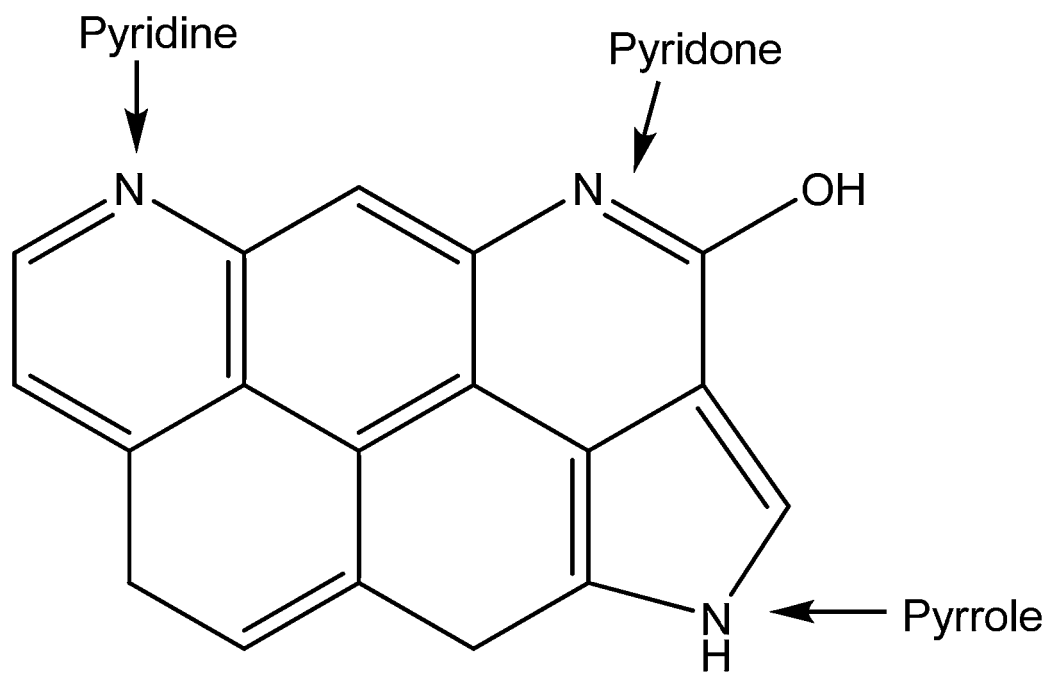
FIG. 1. Nitrogen functionalities on the carbon surface.

In the summary of the invention above and in the Detailed Description of the Invention, and the claims below, and in the accompanying drawings, reference is made to particular features of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises" and grammatical equivalents thereof are used herein to mean that other components, ingredients, steps, etc. are optionally present. For example, and article "comprising" (or "which comprises") component A, B, and C can consist of (i.e. contain only) components A, B, and C, or can contain not only components A, B, and C but also one or more other components.

The term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending on the variable being defined). For example, "at most 4" means 4 or less than 4, and "at most 40%" means 40% or less than 40%. When, in this specification, a range is given as "(a first number) to (a second number)" or "(a first number)-(a second number)", this means a range whose lower limit is the first number and whose upper limit is the second number. For example 25 to 100 mm means a range whose lower limit is 25 mm, and whose upper limit is 100 mm.

In this patent application the term "mesoporous" means having pores with diameters from 2 and 50 nm. The term "microporous" means having pores with diameters smaller than 2 nm. "BET" and "BET surface area" means Brunauer-Emmett-Teller theory (Bunauer et al. 1938) and "DFT" means Density Functional Theory (Lastoskie et al. 1993).

TABLE 1

Carbon formulations from sugars and cornstarch.

| Carbon Formulation | Sugar | Sugar (wt. %) | Ammonium Compound | Ammonium Compound (wt. %) | Cornstarch (wt. %) | Sulfuric Acid (wt. %) |
| --- | --- | --- | --- | --- | --- | --- |
| AMS-11 | Sucrose | 81.9 | None | | | 18.1 |
| AMS-19 | Sucrose | 71.0 | Sulfate | 13.3 | | 16.0 |
| AMS-126 | | | Sulfate | 12.8 | 71.2 | 16.0 |
| AMS-128 | Sucrose | 75.8 | Bisulfate | 24.2 | | |
| AMS-170 | Dextrose | 32 | Sulfate | 20 | 48 | |

TABLE 1-continued

Carbon formulations from sugars and cornstarch.

| Carbon Formulation | Sugar | Sugar (wt. %) | Ammonium Compound | Ammonium Compound (wt. %) | Cornstarch (wt. %) | Sulfuric Acid (wt. %) |
|---|---|---|---|---|---|---|
| AMS-171 | Dextrose | 38 | Bicarbonate | 4.8 | 57 | |
| AMS-172 | Dextrose | 36.4 | Bicarbonate | 9.1 | 54.5 | |
| AMS-173 | Dextrose | 33.3 | Bicarbonate | 13 | 50 | |
| AMS-184 | Dextrose | 38.1 | Urea | 4.8 | 57.1 | |
| AMS-185 | Dextrose | 38.1 | Melamine | 4.8 | 57.1 | |
| AMS-186 | Dextrose | 39 | Urea | 2.4 | 58.5 | |
| AMS-187 | Dextrose | 39 | Melamine | 2.4 | 58.5 | |
| AMS-200 | Dextrose | 36.4 | Melamine | 9.1 | 54.5 | |

The general procedure for making granular carbon is as follows: (Step 1): Mix ingredients (i.e. sugar, HFCS, fines, cornstarch, and ammonium compound) in a mixer. (Step 2): Heat the mixture to 220° C. for 1-2 hours. (thermal step 1). (Step 3):

Remove the char and break up with a jaw crusher. (Step 4): Screen the material. The granular (−4 to +20 mesh) char is collected and the fines are mixed in with the material in Step 1. (Step 5): Carbonize the char in a rotary kiln under nitrogen at 300-1000° C. (thermal step 2). (Step 6): Optionally activate the carbon in a rotary kiln under a flow of carbon dioxide and/or steam at 800-1000° C. (thermal step 3).

In one embodiment the carbon sorbent is made using a nitrogen containing compound, and a carbon source, for example cornstarch and sugars and optionally an acid. Representative formulations are shown in Table 1. In Table 1, "Sulfate" means ammonium sulfate, "Bisulfate" means ammonium bisulfate, "Melamine" means 1,3,5-Triazine-2,4,6-triamine, and "Urea" means diaminomethanal, also known as diaminomethanone, "HFCS" means high fructose corn syrup, "Sulfuric" means sulfuric acid ($H_2SO_4$) In Table 2 "wood" means hardwood chips.

TABLE 2

Carbon formulations from wood.

| Carbon Formulation | Wood (wt. %) | Ammonium Compound | Ammonium Compound (wt. %) | Sulfuric Acid (wt. %) |
|---|---|---|---|---|
| AMS-127 | 71.2 | Sulfate | 12.8 | 16.0 |

Table 3 shows formulations using added activated carbon or carbon black.

TABLE 3

Carbon formulations made with activated carbon and carbon black.

| Carbon Formulation | Sugar | Sugar (wt. %) | Ammonium Compound | Ammonium Compound (wt. %) | Cornstarch (wt. %) | Carbon Source | Carbon (wt. %) |
|---|---|---|---|---|---|---|---|
| ZD511 | Dextrose | 26.6 | Melamine | 4.0 | 48.0 | Carbon black | 16.0 |
| ZD548 | Dextrose | 8.9 | Bicarbonate | 1.8 | 0 | Activated carbon | 89.3 |

Table 4 shows the elemental analyses for the carbon sorbents referenced in this application. The amount of nitrogen in the carbon sorbent is influenced by the type and amount of nitrogen compound in the initial formulation. The amount of nitrogen in the carbon is influenced by the initial formulation and the carbonization temperature.

TABLE 4

Elemental Analysis of Carbons.

| Sample | Nitrogen (wt. %) | Oxygen (wt. %) | Carbon (wt. %) | Hydrogen (wt. %) | Sulfur (wt. %) |
|---|---|---|---|---|---|
| AMS-11 | 0.16 | 7.09 | 88.64 | 3.13 | |
| AMS-19 | 3.24 | 2.44 | 90.98 | 0.53 | 2.19 |
| AMS-126 | 3.56 | 3.29 | 90.79 | 0.65 | 0.16 |
| AMS-127 | 4.05 | 2.26 | 89.44 | 0.61 | 1.69 |
| AMS-128 | 3.31 | 2.46 | 91.49 | 0.56 | 1.12 |
| AMS-170 | 5.58 | 2.20 | 89.66 | 0.44 | |
| AMS-171 | 1.74 | 4.99 | 90.95 | 0.57 | |
| AMS-172 | 1.72 | 1.41 | 94.81 | 0.48 | |
| AMS-173 | 1.44 | 1.33 | 95.37 | 0.40 | |
| AMS-184 | 2.10 | 1.53 | 94.21 | 0.42 | |
| AMS-185 | 2.1 | 1.63 | 94.35 | 0.37 | |
| AMS-186 | 2.58 | 2.56 | 92.84 | 0.65 | |
| AMS-200 | 2.44 | 1.56 | 94.13 | 0.40 | |

Table 5 shows the pore size distribution and surface area for sorbent formulations carbonized under nitrogen or activated with carbon dioxide. Heating the carbon under nitrogen gives a surface area up to 700 $m^2/g$. By activating with carbon dioxide, the surface area can be up to a 2500 $m^2/g$. BET surface area is Brunauer-Emmett-Teller theory (Brunauer et al. 1938) and DFT is Density Functional Theory (Lastoskie et al. 1993). Brunauer 1938 and Lastoskie 1993 are incorporated by reference herein.

TABLE 5

Surface Areas and Pore Volumes of Carbons.

| Sample | BET Surface Area ($m^2/g$) | DFT Total Pore Volume (cc/g) | DFT Micropore Volume (cc/g) | Process Gas | pH |
|---|---|---|---|---|---|
| AMS-11 | 416 | 0.19 | 0.15 | | 4.6 |
| AMS-19 | 401 | 0.17 | 0.17 | $N_2$ | 6.0 |
| AMS-126 | 396 | 0.17 | 0.16 | $N_2$ | 6.8 |
| AMS-127 | 154 | 0.071 | 0.048 | $N_2$ | 10.6 |
| AMS-128 | 263 | 0.12 | 0.092 | $N_2$ | 6.7 |
| AMS-170 | 374 | 0.19 | 0.15 | $N_2$ | 7.0 |
| AMS-171 | 516 | 0.27 | 0.21 | $N_2$ | |
| AMS-172 | 648 | 0.27 | 0.26 | $N_2$ | |
| AMS-172 | 1920 | 0.85 | 0.68 | $CO_2$ | 9.2 |

TABLE 5-continued

Surface Areas and Pore Volumes of Carbons.

| Sample | BET Surface Area (m²/g) | DFT Total Pore Volume (cc/g) | DFT Micropore Volume (cc/g) | Process Gas | pH |
|---|---|---|---|---|---|
| AMS-173 | 473 | 0.25 | 0.19 | $N_2$ | 7.3 |
| AMS-184 | 2550 | 1.09 | 0.78 | $CO_2$ | 11.1 |
| AMS-185 | 2230 | 0.95 | 0.77 | $CO_2$ | 10.8 |
| AMS-186 | 237 | 0.10 | 0.095 | $N_2$ | 7.3 |
| AMS-187 | 457 | 0.19 | 0.18 | $N_2$ | 6.6 |
| AMS-200 | 1483 | 0.63 | 0.58 | | 11.5 |

The elemental composition on the surface of the carbons, can be analyzed by X-ray photoelectron spectroscopy (XPS). For example, for AMS-19 the major elements that are detected are carbon, nitrogen, oxygen, and sulfur.

TABLE 6

Relative elemental composition of sample surfaces as determined by XPS.

| Sample | C (Atom %) | N (Atom %) | O (Atom %) | S (Atom %) |
|---|---|---|---|---|
| AMS-19 | 85 | 2.5 | 4.9 | 0.8 |

The sulfur on the surface of samples AMS-19 has a peak energy that suggests the sulfur is present as either S—C or S—S.

TABLE 7

Relative compositions and most probable peak assignments for carbon species on sample surfaces as determined by XPS, C 1s region.

| Carbon Sample | C—C, C—H, C—S (Atom %) | C—O, C—N (Atom %) | C=O (Atom %) |
|---|---|---|---|
| AMS-19 | 80 | 14 | 4.0 |

TABLE 8

Relative compositions and most probable peak assignments for oxygen species on sample surfaces as determined by XPS, O 1s region.

| Carbon Sample | O—C (Atom %) | O=C (Atom %) |
|---|---|---|
| AMS-19 | 53 | 47 |

The sample showed no evidence of quaternary or oxidized nitrogen. The peak energies suggest that the carbons have a mixture of nitrogen in the form of pyridine and pyridone/pyrrole (FIG. 1).

TABLE 9

Relative compositions and peak assignments for nitrogen species on sample surfaces as determined by XPS, N 1s region.

| Carbon Sample | N—C pyridine (Atom %) | N—C pyridone/pyrrole (Atom %) |
|---|---|---|
| AMS-19 | 66 | 34 |

The sorbent can be regenerated by applying concentration swing, pressure swing and/or a thermal swing. Both the $CO_2$ adsorption and regeneration are rapid. The fast adsorption and regeneration allows short cycle times and high utilization of the sorbent, thereby reducing the system size and overall sorbent inventory. The sorbent works in the presence of moisture.

The amounts of carbon dioxide adsorbed on the carbons have been measured in a constant volume apparatus at various temperatures. It was found that carbons sugar derived carbons with high nitrogen content (AMS-19 and AMS-172) have higher capacities than carbons with little nitrogen (AMS-11).

TABLE 10

Amount of carbon dioxide adsorbed.

| Carbon Sample | Density (g/cc) | $CO_2$ @ 1 atm (wt %) 22° C. | $CO_2$ @ 1 atm (wt %) 60° C. | $CO_2$ @ 0.15 atm (wt %) 22° C. | $CO_2$ @ 0.15 atm (wt %) 60° C. |
|---|---|---|---|---|---|
| AMS-11 | 0.33 | 7.36 | 4.67 | 2.93 | 1.56 |
| AMS-19 | 0.30 | 10.85 | 6.65 | 4.77 | 2.54 |
| AMS-126 | 0.19 | 12.40 | 8.15 | 6.35 | 3.59 |
| AMS-127 | 0.26 | 9.4 | 4.82 | 6.17 | 3.00 |
| AMS-128 | 0.13 | 11.10 | 7.77 | 5.48 | 2.97 |
| AMS-170 | 0.49 | 9.56 | 5.39 | 4.08 | 1.92 |
| AMS-171 | 0.28 | 12.36 | 6.88 | 4.54 | 2.06 |
| AMS-172 ($N_2$) | 0.24 | 14.13 | 8.41 | 5.89 | 3.15 |
| AMS-172 ($CO_2$) | 0.18 | 13.25 | 6.83 | 4.48 | 2.43 |
| AMS-173 | 0.40 | 11.09 | 7.14 | 4.29 | 2.46 |
| AMS-184 | 0.12 | 13.43 | 7.05 | 4.89 | 2.92 |
| AMS-185 | 0.17 | 13.25 | 6.82 | 4.5 | 2.47 |
| AMS-186 | 0.33 | 9.93 | 6.12 | 4.45 | 2.42 |
| AMS-187 | 0.45 | 10.46 | 6.28 | 4.51 | 2.24 |
| AMS-200 | 0.22 | 14.15 | 7.04 | 4.86 | 2.39 |

Figure 2:
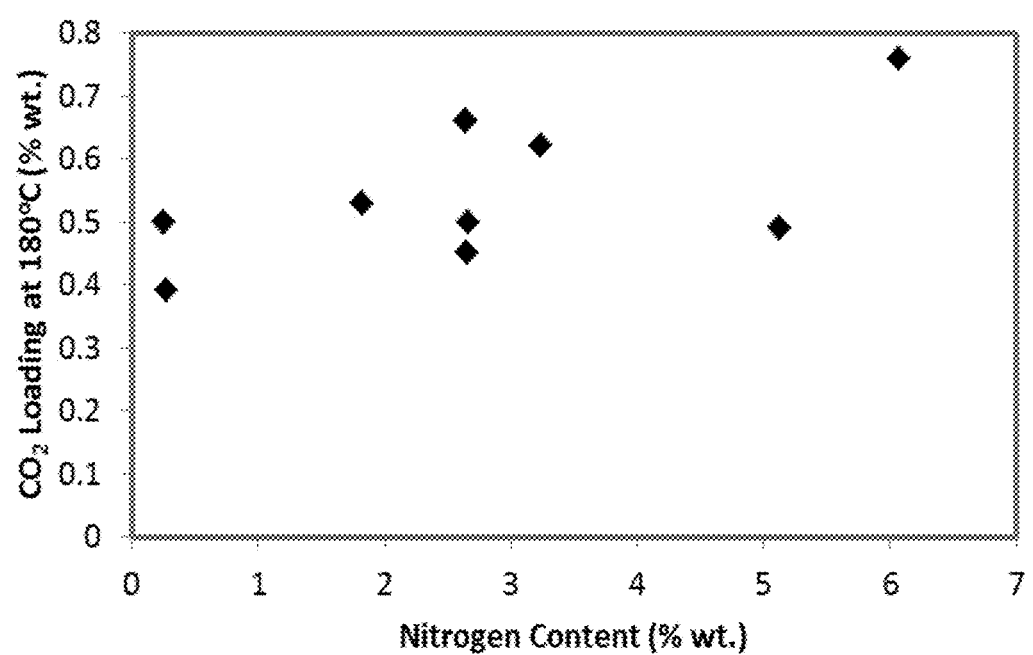
FIG. 2. $CO_2$ loading versus nitrogen content at 180° C.
Figure 3:
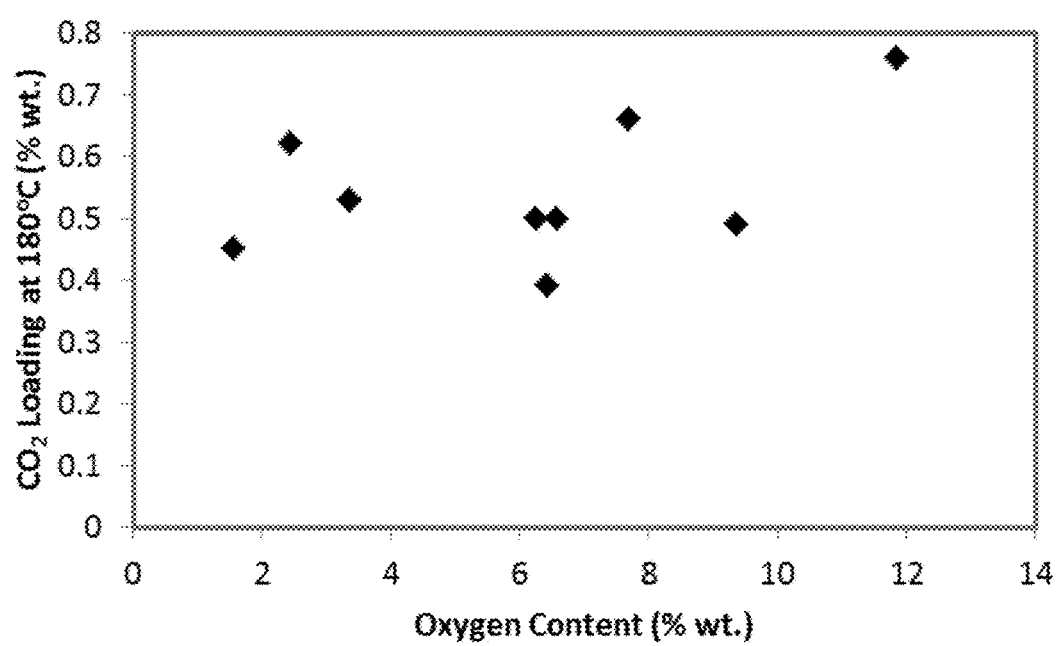
FIG. 3. $CO_2$ loading versus oxygen content at 180° C.
Figure 8:
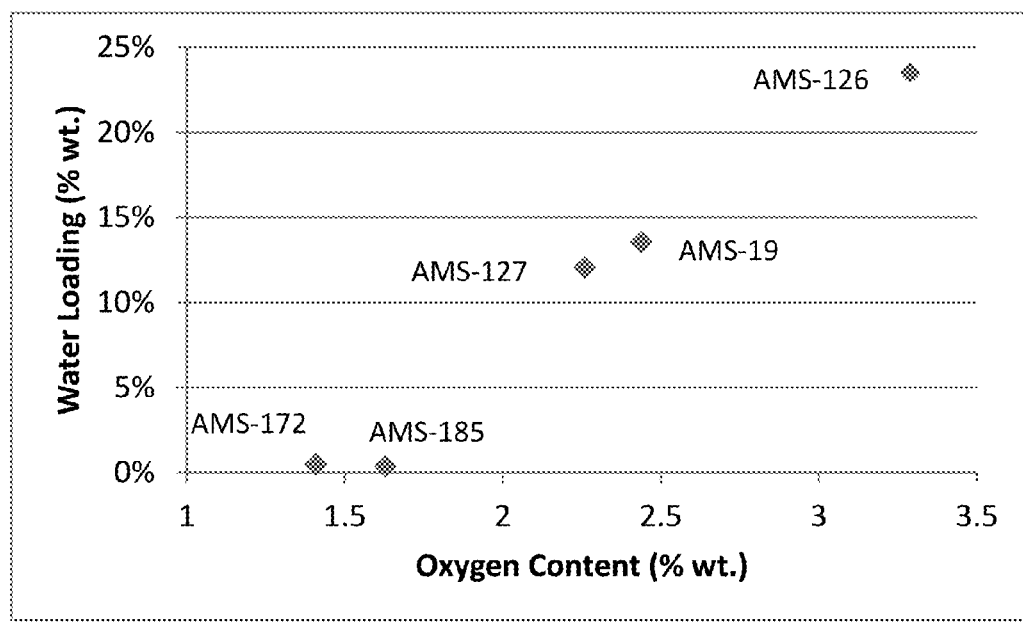
FIG. 8. Water sorption.

FIG. 8 shows the impact of oxygen content of the carbons on the water loading at 25° C. The lower the oxygen content, the less water is adsorbed onto the carbon. With an oxygen content of <3% wt. there is <15% wt. water uptake. With an oxygen content of <2% wt. there is <5% wt. water uptake. FIG. 2 and FIG. 3 show the impact of nitrogen and oxygen content of the carbons on the $CO_2$ loading at 180° C. The higher the nitrogen and oxygen content the greater the $CO_2$ capacity. However, in certain embodiments of this invention it is advantageous to minimize the oxygen content. Oxygen present in the carbon can promote gasification of the carbon (resulting in mass loss of the sorbent).

Figure 4:
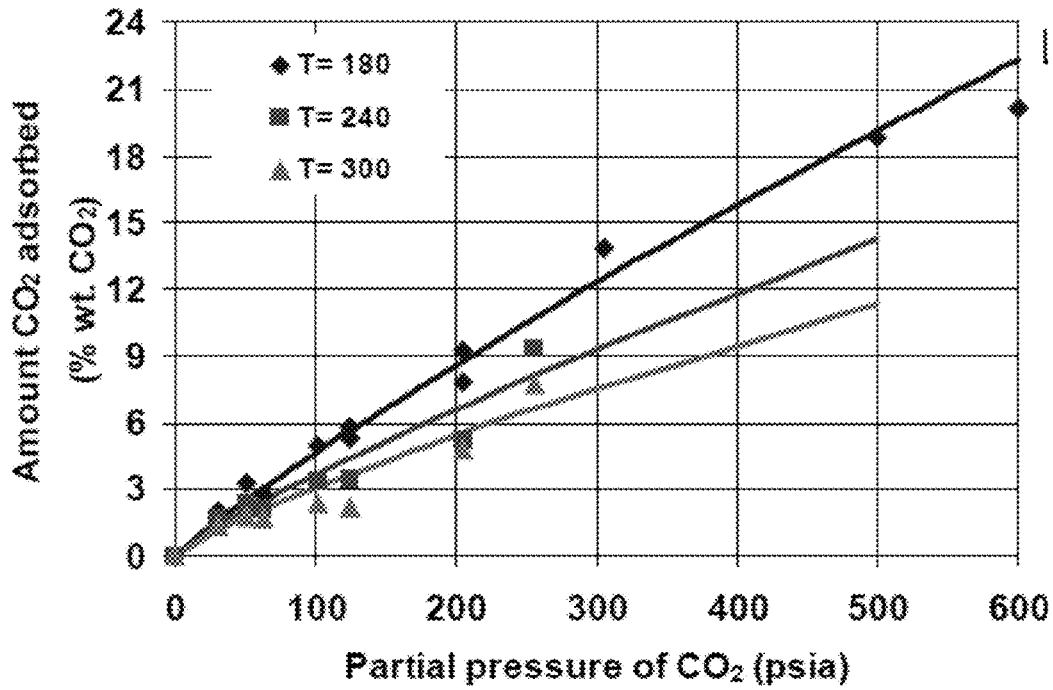
FIG. 4. $CO_2$ Isotherms at different temperatures (T=180, 240 and 300° C.) and the fitted Langmuir-Freundlich isotherm parameters.

Sorbent AMS-19 had a capacity in excess of 20% wt. $CO_2$ at higher $CO_2$ partial pressures (180° C. and 600 psia $CO_2$ partial pressure) and the experimental data from the bench-scale tests were fitted with Langmuir-Freundlich isotherms as shown in FIG. 4.

Table 11 shows the water uptake/capacity for various sorbents of this invention.

TABLE 11

Water uptake/capacity for various sorbents of this invention.

| Sample | Oxygen Content in Sorbent (% wt.) | Water Uptake (% wt.) |
|---|---|---|
| AMS 19 | 2.44 | 13.54% |
| AMS 126 | 3.29 | 23.5% |
| AMS 127 | 2.26 | 12.1% |
| AMS-185 | 1.63 | 0.37% |
| AMS-172 | 1.41 | 0.49% |

Figure 9:
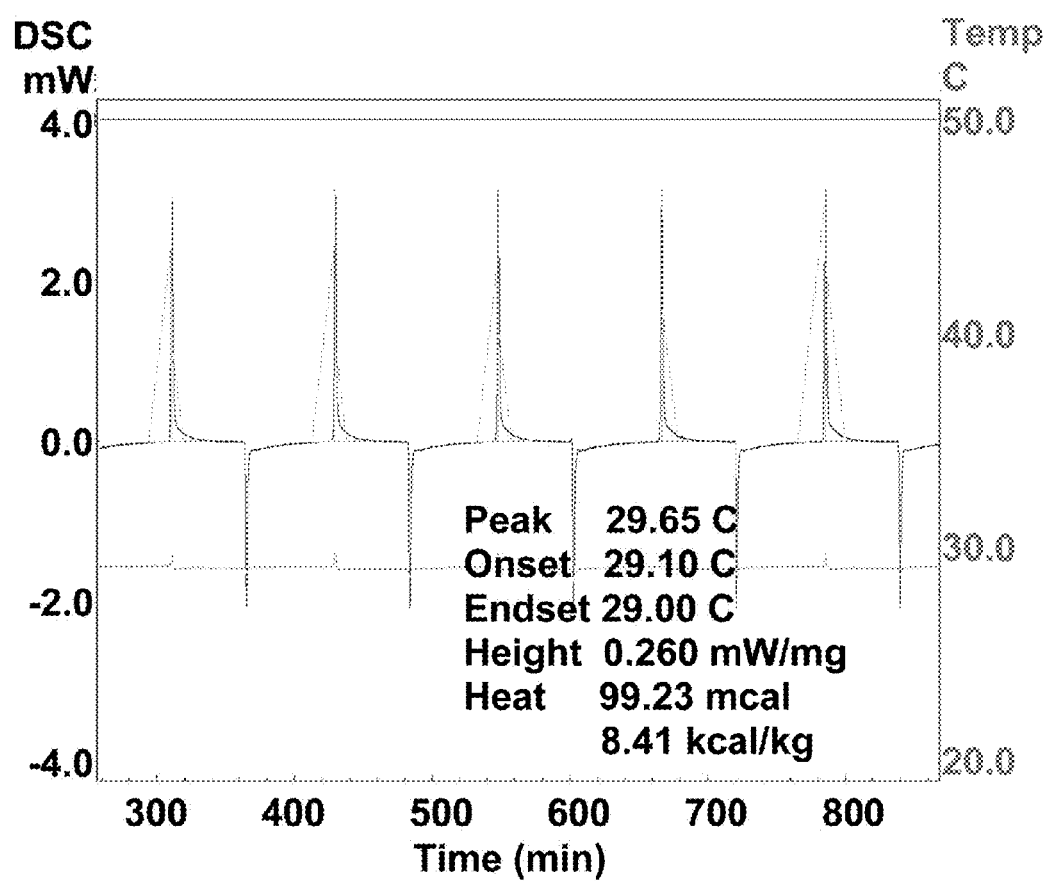
FIG. 9. Heat release due to $CO_2$ adsorption on AMS-19 as measured in DSC.
Figure 10:
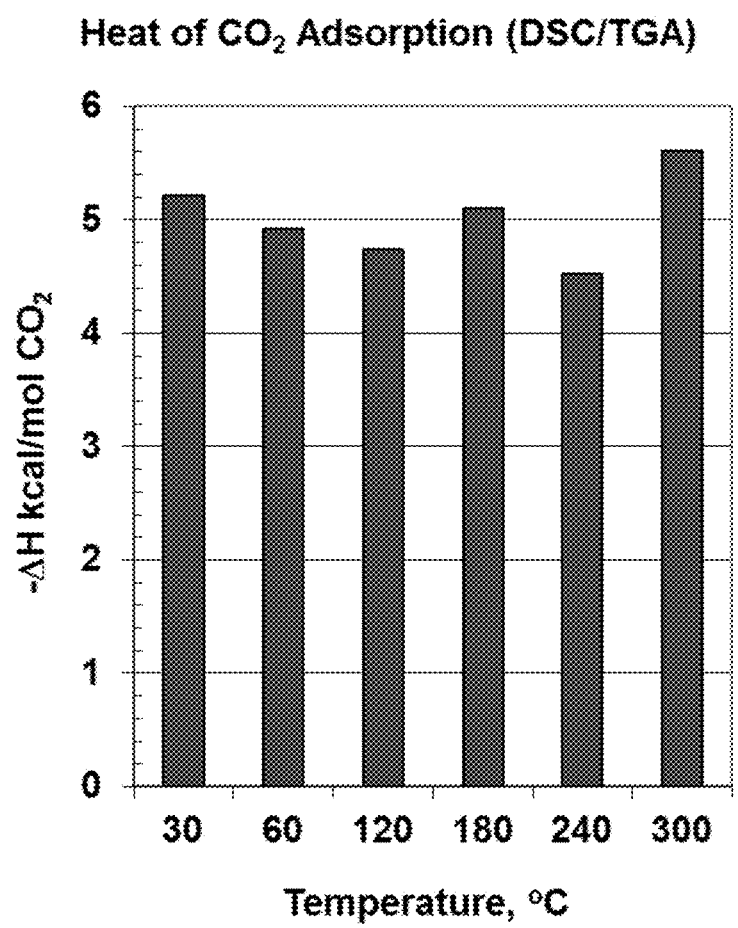
FIG. 10. Heat of adsorption of $CO_2$ on AMS-19 as measured in DSC/TGA.
Figure 11:
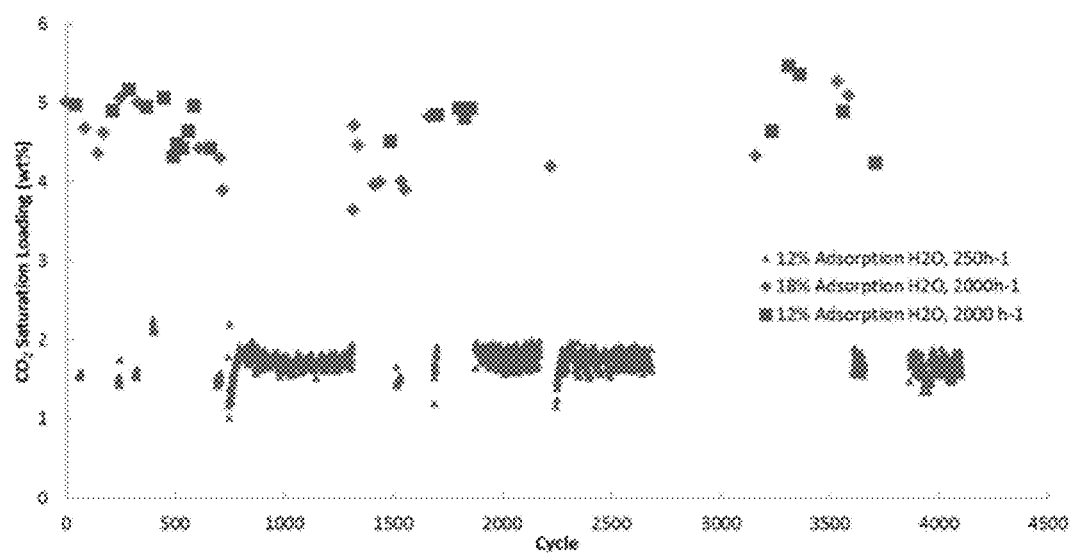
FIG. 11. Sorbent performance under vacuum swing adsorption cycles in simulated flue gas at T=60-70° C., Pads=18 psia, Pdes=3 psia, GHSV=250 or 2,000 $h^{-1}$.
Figure 12:
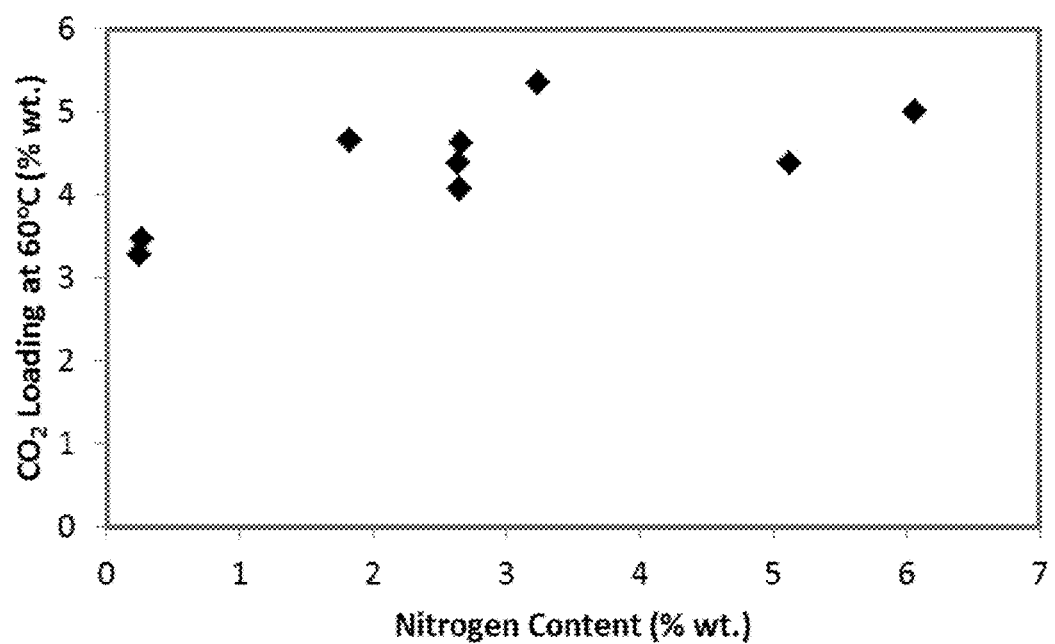
FIG. 12. $CO_2$ loading versus nitrogen content at 60° C.
Figure 13:
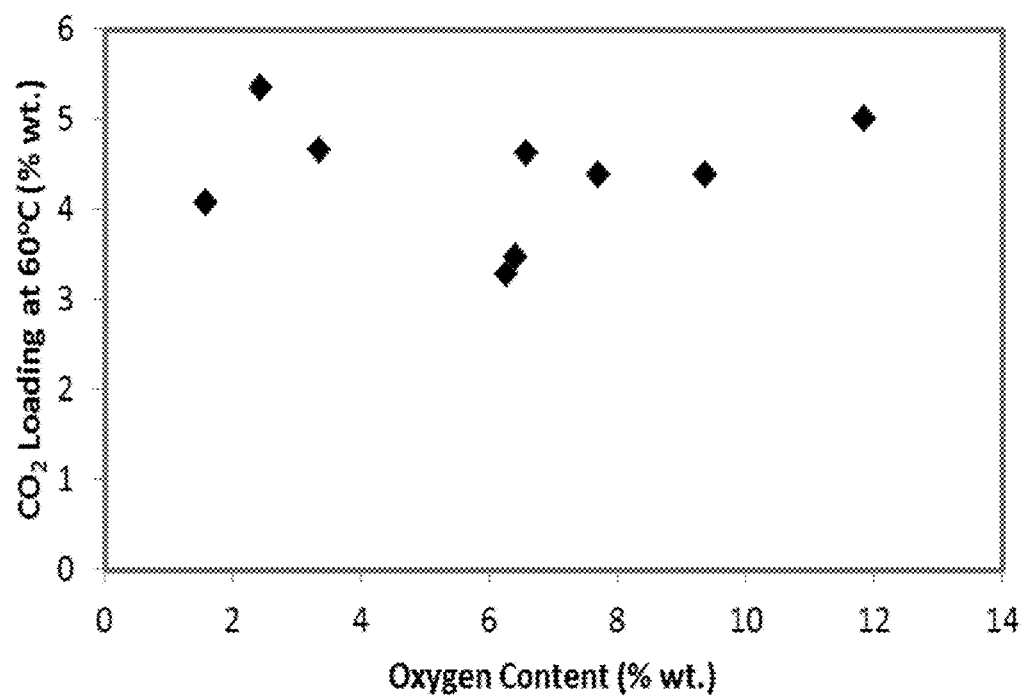
FIG. 13. $CO_2$ loading versus oxygen content at 60° C.

The heat of adsorption can be quantified with laboratory techniques. Using AMS-19 as a specific example, we measured the heat of adsorption in a differential scanning calorimeter (DSC) and combined it with the amount of $CO_2$ adsorbed under similar conditions from thermogravimetric analyzer (TGA) to calculate the heat released (heat of adsorption) for adsorption of one mole of $CO_2$ on our sorbent. We placed about 10 mg sample in the DSC and carried out multiple cycles at a set temperature (for example different tests at 30, 60, 120, 180, 240 or 300° C.) changing the process gas between pure He and $CO_2$. The sample released heat on exposure to $CO_2$ and absorbed heat during desorption, providing the heat of adsorption in kcal/g of sorbent. We then repeated the same experiments in the TGA, we placed about 10 mg sample in the TGA and carried out multiple cycles at a set temperature (again for example at 30, 60, 120, 180, 240 or 300° C.) changing the process gas between pure He and $CO_2$. The weight change will provide the amount of $CO_2$ adsorbed per g of sorbent. Combining the heat of adsorption from DSC and the $CO_2$ capacity from TGA, we calculate the heat of adsorption per mole of $CO_2$, and it was between 4.5 and 5.6 kcal per mol. FIG. 9 shows the heat release due to adsorption as measured in DSC. FIG. 10 shows the heat of $CO_2$ adsorption as a function of temperature for AMS-19 as measured in DSC/TGA. In comparison, amine sorbents require three times more energy (~14.4 kcal per mole $CO_2$) and the alkali sorbents that form a covalent bond with $CO_2$ needs five times more energy, 27 to 37 kcal for each mole of $CO_2$ (and water).

Table 12 shows the isosteric heat of adsorption data as calculated from $CO_2$ isotherms for other sorbent samples. The $-\Delta H_{ads}$ varies from about 6.4 to 8.3 kcal per mole of $CO_2$. These tests used a constant volume apparatus commonly known as Sieverts apparatus and routinely used for adsorption isotherm measurements.

TABLE 12

Isosteric heat of adsorption for sorbents of the present invention.

| Carbon Sample | $-\Delta H_{ads}$ kcal/mol |
|---|---|
| AMS-11 | 6.41 |
| AMS-19 | 8.29 |
| AMS-126 | 7.25 |
| AMS-127 | 7.30 |
| AMS-128 | 6.49 |
| AMS-170 | 6.89 |
| AMS-171 | 6.49 |
| AMS-172 ($N_2$) | 6.67 |
| AMS-172 ($CO_2$) | 7.04 |
| AMS-173 | 5.10 |
| AMS-184 | 5.49 |
| AMS-185 | 6.88 |
| AMS-186 | 6.46 |
| AMS-187 | 6.42 |
| AMS-200 | 7.65 |
| Vapure410 | 6.49 |

The sorbents of this invention may be used, for example, for $CO_2$ removal from anaerobic digester gas. This sorbent can be used in a vacuum swing or pressure swing adsorption process to achieve pipeline quality methane.

The sorbents of this invention may be used for $CO_2$ removal from flue gas. This sorbent can be used in a pressure, vacuum, temperature or concentration swing adsorption process.

Example 1

Figure 5:
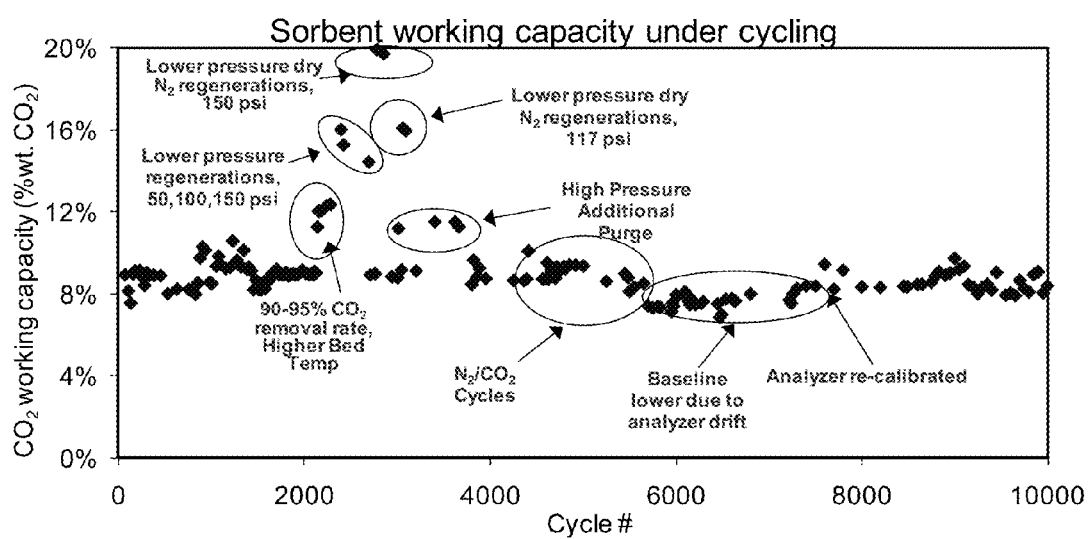
FIG. 5. TDA's $CO_2$ sorbent's working capacity under cycling in simulated synthesis gas at 240° C. and 500 psig.
Figure 6:
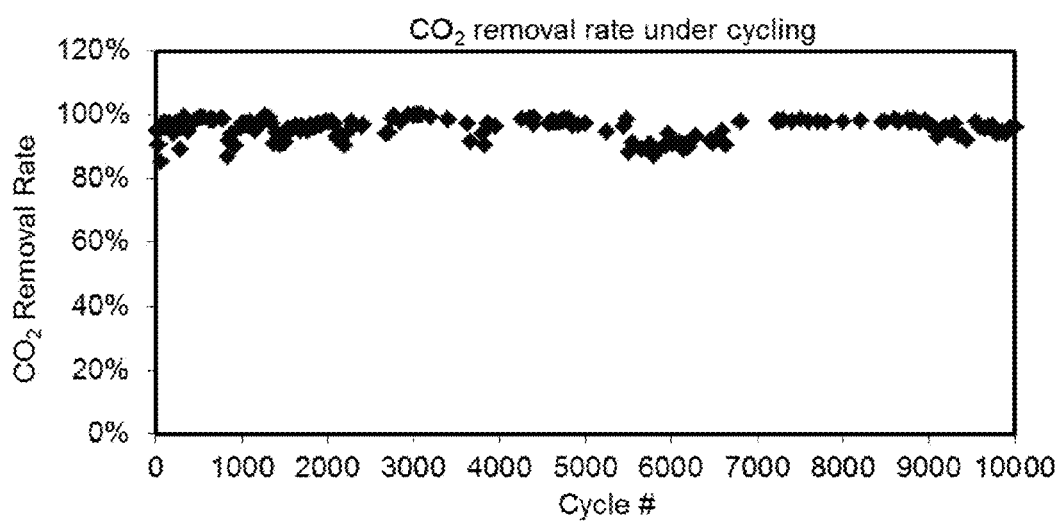
FIG. 6. Sorbent $CO_2$ removal rate under cycling in simulated synthesis gas.
Figure 7:
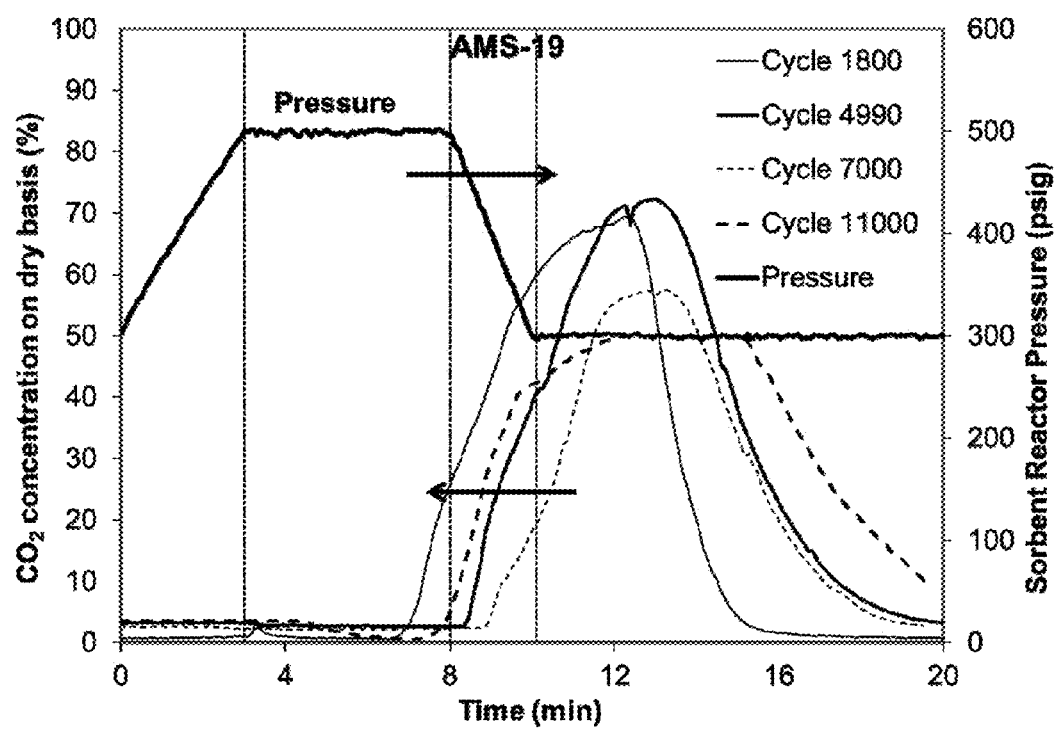
FIG. 7. $CO_2$ breakthrough profile from the long-term cycling experiments.

A long-term cycling experiment was conducted in a 1.3 L sorbent reactor under representative conditions using simulated synthesis gas. Sorbent AMS-19 was used. This test completed over 10,000 cycles and the sorbent maintained a stable performance (FIG. 5). The $CO_2$ removal rate is provided in FIG. 6. The $CO_2$ breakthrough during from cycling is shown in FIG. 7.

During these tests, in some experiments, the desorption (regeneration) conditions were varied by changing the desorption pressure and purge volume etc. For cycles 2100-2163, this test increased the adsorption bed temperature to 260° C. This increased the working capacity of our sorbent from 9% at the baseline conditions up to 12.4% wt. $CO_2$. For cycles 2164-2310 this test decreased the regeneration pressure to 50 psi, 100 psi, and 150 psi. These regeneration pressures all resulted in a capacity of about 15% wt. $CO_2$. For cycles 2672-2716, the normal adsorption cycles ran with dry nitrogen regenerations at 150 psi. This resulted in the highest capacities, about 20% wt. $CO_2$. For cycles 2977-3014, normal adsorption cycles ran with dry nitrogen regenerations at 117 psi. This resulted in capacities of about 16% wt. $CO_2$. For cycles 3050-3096, baseline conditions ran, but with an added 5-minute dry nitrogen purge at 500 psi. This resulted in capacities of about 11.5% wt. $CO_2$. $N_2/CO_2/H_2O$ ran from cycles 3614-4425. This resulted in very similar capacities to baseline conditions (8-10 wt. % $CO_2$). In the cycles between 5,500 to 7,000 cycles the $CO_2$ capacities and removal efficiency appeared to be lower; this was due to drift in the analyzer. Once re-calibrated, the analyzer measured sorbent performance that was back to original capacity of about 8% wt. $CO_2$ at standard test conditions.

Example 2

Using AMS-172 as a specific example, 9.1 wt. % ammonium bicarbonate, 36.4 wt. % dextrose and 54.5 wt. % cornstarch were thoroughly mixed in a standard Kitchen Aid mixer. To the powder was added 16 wt. % water. The material was dried in a Despatch box oven at 110° C. for 12 hours, followed by 200° C. for 4 hours. The char was removed and ground with a Bico Chipmunk jaw crusher. The crushed material was screened in a Sweco sifter and the −4 to +20 mesh cut was collected. The material was devolatilized at 400° C. under nitrogen in a Bartlett and Snow continuous rotary kiln. The carbon was heat treated further under nitrogen in a Bartlett and Snow continuous rotary kiln at 900° C. for 1 hour. (BET surface area 648 m$^2$/g).

Example 3

Using AMS-185 as a specific example, 4.8 wt. % melamine, 38.1 wt. % dextrose and 57.1 wt. % cornstarch were thoroughly mixed in a standard Kitchen Aid mixer and enough water added to form a paste. The mixture was added to Teflon trays and heated to 200° C. for 2 hours in a Despatch box oven. The char was removed and ground with a Bico Chipmunk jaw crusher. The crushed material was screened in a Sweco sifter and the −4 to +20 mesh cut was collected. The granular char was carbonized at 400° C. under nitrogen for 2 hours and activated with carbon dioxide at 950° C. in a rotary kiln for 4 hours (BET surface area 2230 m$^2$/g).

Example 4

Using AMS-19 as a specific example, adsorption and desorption cycles are conducted in a 100 mL sorbent reactor under representative conditions using simulated flue gas. This test completed over 4,200 cycles and the sorbent maintained a stable performance. The $CO_2$ capacity of the sorbent during these cycles are provided in FIG. 6. The $CO_2$ breakthrough during from cycling is shown in FIG. 7. During these tests, in some experiments, the gas hourly space velocity (GHSV) was changed from 250 to 2,000 h$^{-1}$ and the water concentration in the flue gas was changed from 12% to 18%. The increase in space velocity increased the capacity of our sorbent from 1.7% at the baseline conditions up to 5% wt. $CO_2$.

Example 5

Figure 14:
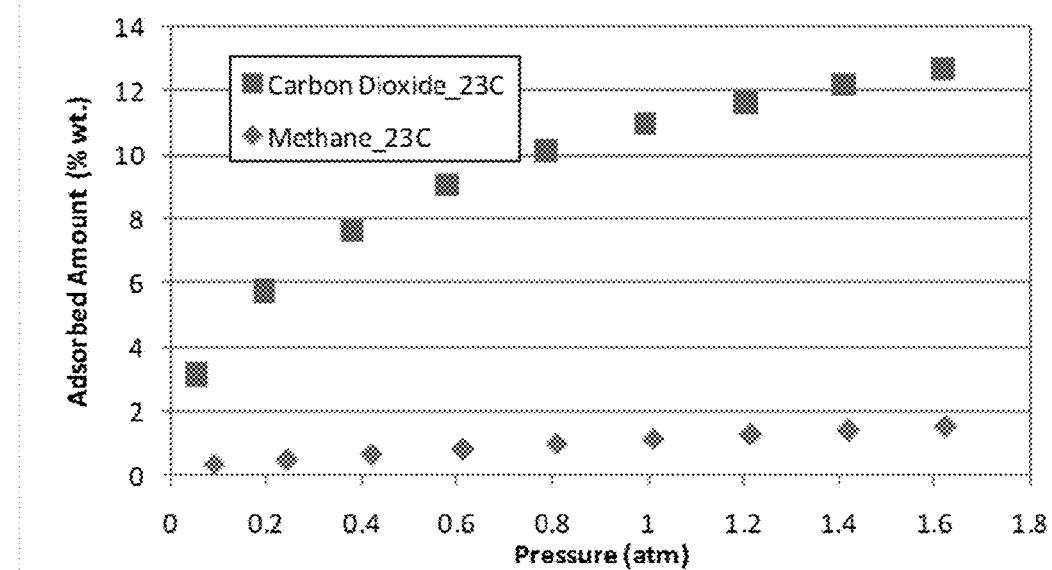
FIG. 14. Adsorption isotherms on AMS-127 at 23° C.
Figure 15:
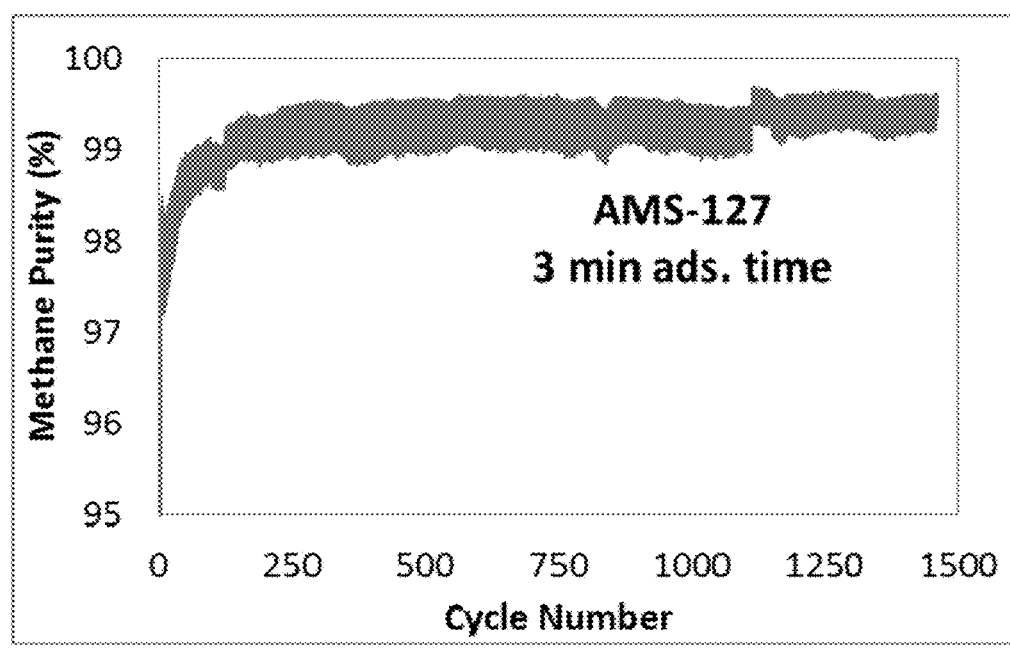
FIG. 15. Extended multiple cycle tests with AMS-127 in a two-bed vacuum swing cycling system showing methane product purity. $CH_4$=60%, $CO_2$=40%, (dry basis), $H_2O$=sat. at 22° C., GHSV=62.5 $h^{-1}$; T=ambient, $P_{ads}$=19.0 psia, $P_{des}$=0.2 psia, L/D=8.

$CO_2$ and $CH_4$ isotherms for a carbon sorbent prepared from wood (AMS-127) were measured in a constant volume apparatus. FIG. 14 shows the $CO_2$ and $CH_4$ isotherms for carbon sorbent prepared from wood (AMS-127). The sorbent achieved a $CO_2$ loading of 10.9% wt. $CO_2$ at 1 atm partial pressure while the methane adsorption is only 1.15% wt. $CH_4$ at 1 atm partial pressure ($CO_2/CH_4$ selectivity of 3.45). This high $CO_2$ selectivity for the carbon results in a significant reduction in methane loss in the vacuum swing adsorption process. Vacuum swing adsorption-desorption cycles were carried out at two different space velocities with carbon sorbent prepared from wood (AMS-127) in a two-bed vacuum swing cycling system. The methane product purity as measured from the exit of the two-bed vacuum swing cycling system from the extended multiple cycle tests with AMS-127 is shown in FIG. 15. The AMS-127 sorbent also achieves very high methane purities under two-bed vacuum swing cycles.

What is claimed is:

1. A carbon sorbent for the removal of carbon dioxide from gas streams, comprising:
    (a) a $CO_2$ capacity of at least 9 weight percent when measured at 22° C. and 1 atmosphere;
    (b) an $H_2O$ capacity of at most 1 weight percent when measured at 25° C. and 1 atmosphere;
    (c) an isosteric heat of adsorption of from 6 to 8.5 kilocalories per mole of $CO_2$; and,
    (d) a nitrogen content of at least 2.2 wt %, which is present in the form of pyridine, pyridone or pyrrole.

2. The carbon sorbent of claim 1, wherein the isosteric heat of adsorption is from 6.0 to 7.7 kilocalories per mole of $CO_2$.

3. The carbon sorbent of claim 1 further comprising: a $CO_2$ capacity of at least 7 weight percent when measured at 60° C. and 1 atmosphere.

4. The carbon sorbent of claim 1 further comprising: a $CO_2$ capacity of at least 4.8 weight percent when measured at 22° C. and 0.15 atmosphere.

5. The carbon sorbent of claim 1 further comprising: a $CO_2$ capacity of at least 2.3 weight percent when measured at 60° C. and 0.15 atmosphere.

6. A carbon sorbent in a powder, a granular or a pellet form for the removal of carbon dioxide from gas streams, comprising:
    (a) a carbon content of at least 90 weight percent;
    (b) a nitrogen content of at least 2.2 weight percent, which is present in the form of pyridine, pyridone or pyrrole;
    (c) an oxygen content of at most 1.8 weight percent;
    (d) a BET surface area from 50 to 2600 m$^2$/g; and,
    (e) a DFT micropore volume from 0.04 to 0.8 cc/g.

7. The carbon sorbent of claim 6, further comprising: an $H_2O$ capacity of at most 1 weight percent, based on the mass of the sorbent when measured at 25° C. and 1 atmosphere.

8. The carbon sorbent of claim 6, further comprising: an isosteric heat of adsorption of from 6.0 to 8.5 kilocalories per mole of $CO_2$.

9. The carbon sorbent of claim 8, wherein the isosteric heat of adsorption is from 6.0 to 7.7 kilocalories per mole of $CO_2$.

10. The carbon sorbent of claim 6, further comprising: a carbon dioxide capacity of at least 9 weight percent when measured at 1.0 atmosphere and 22° C.

11. The carbon sorbent of claim 6, further comprising: a carbon dioxide capacity of at least 4.8 weight percent when measured at 0.15 atmosphere and 22° C.

12. The carbon sorbent of claim 6, further comprising: a carbon dioxide capacity of at least 7 weight percent when measured at 1.0 atmosphere and 60° C.

13. The carbon sorbent of claim 6, further comprising: a carbon dioxide capacity of at least 2.3 weight percent when measured at 0.15 atmosphere and 60° C.

14. The carbon sorbent of claim 6, further comprising: a pH of at least 9.0.

15. The carbon sorbent of claim 14, further comprising: a pH of at least 11.0.

* * * * *